US012803112B2

(12) United States Patent
Kang et al.

(10) Patent No.: US 12,803,112 B2
(45) Date of Patent: Nov. 17, 2026

(54) GAS COLLECTION DEVICE

(71) Applicant: LG ENERGY SOLUTION, LTD., Seoul (KR)

(72) Inventors: Hye Ok Kang, Daejeon (KR); Heesun Yun, Daejeon (KR); Jong Keun Lee, Daejeon (KR); Nak Hee Choi, Daejeon (KR); Dongguk Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 580 days.

(21) Appl. No.: 18/287,452

(22) PCT Filed: Oct. 13, 2022

(86) PCT No.: PCT/KR2022/015455
§ 371 (c)(1),
(2) Date: Oct. 18, 2023

(87) PCT Pub. No.: WO2023/120910
PCT Pub. Date: Jun. 29, 2023

(65) Prior Publication Data

US 2024/0204350 A1 Jun. 20, 2024

(30) Foreign Application Priority Data

Dec. 24, 2021 (KR) ........................ 10-2021-0186715

(51) Int. Cl.
*H01M 50/30* (2021.01)
*H01M 50/107* (2021.01)
*H01M 50/152* (2021.01)
*G01N 1/22* (2006.01)
*H01M 10/42* (2006.01)

(52) U.S. Cl.
CPC ....... *H01M 50/394* (2021.01); *H01M 50/107* (2021.01); *H01M 50/152* (2021.01); *G01N 1/2226* (2013.01); *H01M 10/4285* (2013.01)

(58) Field of Classification Search
CPC ............ H01M 50/394; H01M 10/4285; G01N 1/2226
See application file for complete search history.

(56) References Cited

U.S. PATENT DOCUMENTS

| | | | |
|---|---|---|---|
| 2020/0144681 A1 | 5/2020 | Kim et al. |
| 2021/0226265 A1 | 7/2021 | Lee et al. |
| 2021/0234224 A1 | 7/2021 | Noh et al. |
| 2021/0344055 A1 | 11/2021 | Hwang et al. |

FOREIGN PATENT DOCUMENTS

| | | | |
|---|---|---|---|
| JP | 2001332312 A | 11/2001 |
| KR | 10-2017-0041102 A | 4/2017 |
| KR | 10-2017-0041103 A | 4/2017 |
| KR | 10-2018-0047280 A | 5/2018 |
| KR | 10-2019-00119500 A | 10/2019 |
| KR | 10-2019-0132906 A | 11/2019 |

(Continued)

*Primary Examiner* — Stephan J Essex
(74) *Attorney, Agent, or Firm* — Bryan Cave Leighton Paisner LLP

(57) ABSTRACT

The present disclosure relates to a gas collection device. The objective of the present disclosure is to provide a gas collection device capable of collecting highly concentrated gas for a battery having a case made of a rigid material of various sizes, particularly, for a cylindrical battery.

16 Claims, 3 Drawing Sheets

(56) References Cited

FOREIGN PATENT DOCUMENTS

| | | | | |
|---|---|---|---|---|
| KR | 20190132906 | A * | 11/2019 | ........... G01N 1/2226 |
| KR | 10-2055443 | B1 | 12/2019 | |
| KR | 10-2020-0072185 | A | 6/2020 | |
| KR | 10-2154900 | B1 | 9/2020 | |
| KR | 10-2256488 | B1 | 5/2021 | |
| KR | 10-2021-0090417 | A | 7/2021 | |
| KR | 10-2021-0103764 | A | 8/2021 | |
| KR | 10-2021-0125283 | A | 10/2021 | |
| WO | 2014/003474 | A1 | 1/2014 | |

* cited by examiner

GAS COLLECTION DEVICE

CROSS-REFERENCE TO RELATED APPLICATION

The present application is a National Phase entry pursuant to 35 U.S.C. § 371 of International Application No. PCT/KR2022/015455, filed on Oct. 13, 2022, and claims the benefit of and the priority to Korean Patent Application No. 10-2021-0186715, filed on Dec. 24, 2021, the entire contents of which is are hereby incorporated by reference in its their entirety.

TECHNICAL FIELD

The present disclosure relates to a gas collecting apparatus, more specifically, to a gas collecting apparatus capable of collecting high-concentration gas for a battery that has a case made of a rigid material with various specifications, particularly a cylindrical battery.

BACKGROUND

In general, a secondary battery is a battery that is repeatedly usable through a discharging process to convert chemical energy into electrical energy and a charging process that is performed in a reverse way, types of which include nickel-cadmium (Ni—Cd) batteries, nickel-metal hydride (Ni-MH) batteries, lithium-metal batteries, lithium-ion batteries, and lithium-ion polymer batteries. Thereamong, lithium secondary batteries with high energy density and voltage, long life cycle, and low self-discharge rate have been commercialized and used widely.

Depending on reactions in the lithium secondary battery, various types of gas may be generated, such as hydrogen, oxygen, nitrogen, carbon monoxide, carbon dioxide, hydrocarbons represented by $C_nH_{2n-2}$ (n=2~5), $C_nH_{2n}$ (n=2~5), $C_nH_{2n+2}$ (n=1~5), and other organic gas species.

In addition, the lithium secondary battery deteriorates as a large amount of gas is generated due to decomposition of electrolytes in accordance with repeated charging and discharging processes, and the aspect varies depending on the design and usage of a battery. Therefore, it is necessary to infer a deterioration mechanism of the battery by analyzing gas generated inside the battery during a development process of the battery.

Accordingly, importance lies in accurate analysis by collecting gas generated inside the secondary battery. Various gases are generated upon operation of lithium-ion batteries, and information on composition and content of generated gas is useful in development of battery materials, optimization of battery manufacturing processes, and grasping of causes of battery malfunction. To this end, it is important to develop a technology for collecting gas generated inside the secondary battery.

Used as a method of collecting gas generated inside a secondary battery is a method which includes accommodating a battery in a diffusion chamber having a closed space formed therein, forming an opening for discharging gas in a battery case, and collecting the diffused gas in a separate gas collection container when the gas discharged through the opening is diffused inside the diffusion chamber. For collecting high-concentration gas, it may be most desirable that no gap exists between the battery and an internal space of the diffusion chamber.

Recently, batteries are used in a wide range of industries, performance required for batteries also varies depending on various application environments and conditions for the battery, and the batteries may be designed in various specifications.

Conventionally, for a variety of battery designs, individual diffusion chambers for gas collection are used according to size of the batteries, causing difficulties in manufacturing and installing new ones every time the battery model is changed. In addition, if there is no gap between the battery and the internal space of the diffusion chamber, it is difficult to remove the battery from the diffusion chamber, and gas concentration for analysis is lowered when a considerably large diffusion chamber is used.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Goals

The present disclosure relates to a gas collecting apparatus, and an object of the present disclosure may be to provide to a gas collecting apparatus capable of collecting high-concentration gas for a battery that has a case made of a rigid material with various specifications, particularly a cylindrical battery.

Technical objects to be achieved by the present disclosure are not limited to the technical problems mentioned above, and other technical objects not mentioned will be clearly understood from the description below by those of ordinary skill in the art to which the present disclosure pertains.

Technical Solutions

A gas collecting apparatus of the present disclosure may include:

- a lower jig including a battery insertion groove configured to accommodate a lower end of a battery so that an upper end of the battery protrudes from an upper surface of the lower jig;
- an upper jig including a lower surface in close contact with the upper surface of the lower jig and a battery insertion hole configured to accommodate the upper end of the battery so that an upper surface of the battery is exposed;
- a lower housing accommodating the lower jig therein; and
- an upper housing accommodating the upper jig therein and having a lower end coupled to an upper end of the lower housing.

Advantageous Effects

A gas collecting apparatus of the present disclosure is capable of collecting high-concentration gas for various batteries, while it is easy to mount, replace, or remove the battery at the beginning and end of analysis.

DETAILED DESCRIPTION

Figure 1:
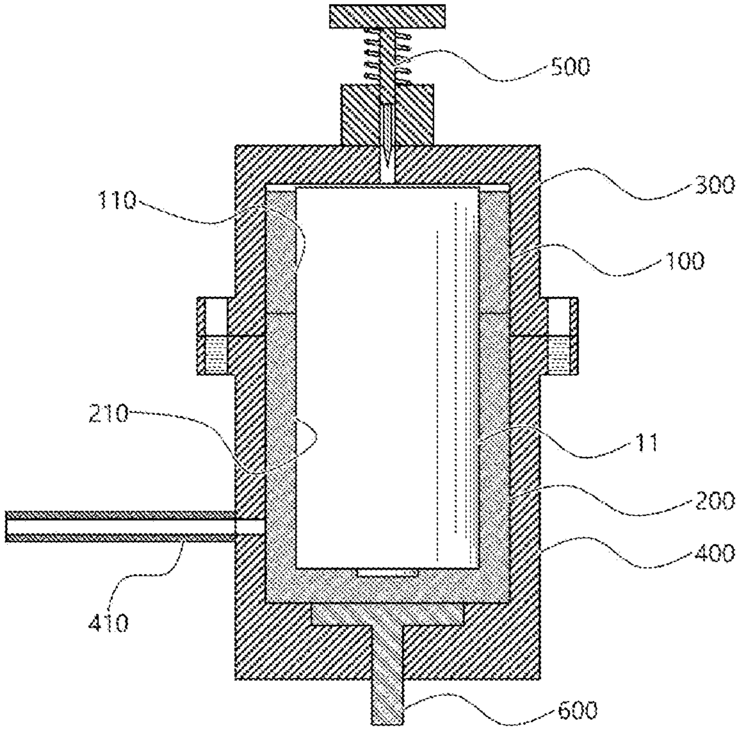
FIG. 1 is a cross-sectional view illustrating a gas collecting apparatus of the present disclosure.

A gas collecting apparatus of the present disclosure may include:

- a lower jig in which a battery insertion groove into which a lower end of a battery is inserted is formed on an upper surface so that an upper end of the battery protrudes;
- an upper jig having a lower surface in close contact with the upper surface of the lower jig and a battery insertion hole into which the battery is inserted so that an upper surface of the battery is exposed;
- a lower housing configured to accommodate the lower jig therein; and
- an upper housing configured to accommodate the upper jig therein and having a lower end coupled to an upper end of the lower housing.

On a ceiling surface of the upper housing in the gas collecting apparatus of the present disclosure, a punching portion configured to form a gas discharge hole by perforating an upper end of the battery may be provided.

In the gas collecting apparatus of the present disclosure, a needle passage hole may be formed on an upper surface of the upper housing, and the punching portion may include a needle member inserted into the upper housing through the needle passage hole and having a lower end penetrating the upper end of the battery to form the gas discharge hole, a body member positioned above the upper housing and having a lower end coupled to an upper end of the needle member, a guide member coupled to an upper end of the upper housing and provided with a guide hole configured to guide a vertical movement of the body member, a pressing member coupled to an upper end of the body member that protrudes toward the upper end of the guide member, and an elastic member inserted between a lower end of the pressing member and an upper end of the guide member.

In the gas collecting apparatus of the present disclosure, a button portion configured to press a lower end of the lower jig to push up the lower jig may be provided on a bottom surface of the lower housing.

In the gas collecting apparatus of the present disclosure, an ascending member insertion hole may be formed on a lower surface of the lower housing, and the button portion may include a support member whose upper surface is in contact with a lower surface of the lower jig in the lower housing to support the lower jig, and an ascending member having an upper end coupled to a lower surface of the support member and a lower end protruding more downward than a lower end of the lower housing through the ascending member insertion hole.

The support member of the gas collecting apparatus of the present disclosure may be provided in a disc shape that has a plane perpendicular to a vertical direction, the ascending member is provided in a cylindrical shape that extends in the vertical direction, and a diameter of the support member may be formed to be greater than that of the ascending member.

In the gas collecting apparatus of the present disclosure, a support member insertion groove into which the support member is inserted may be formed on the bottom surface of the lower housing.

A gas discharge pipe configured to discharge gas generated in the battery may be connected to the lower housing in the gas collecting apparatus of the present disclosure.

In the gas collecting apparatus of the present disclosure, a first flow path may be formed in the upper jig, a second flow path may be formed in the lower jig, and gas discharged from the battery through the gas discharge hole may be transferred to the gas discharge pipe through the first flow path and the second flow path.

In the gas collecting apparatus of the present disclosure, an upper surface of the upper jig may be spaced apart from the ceiling surface of the upper housing, the first flow path may be formed as a first gas discharge groove that extends in a vertical direction on an outer circumferential surface of the upper jig, and the second flow path may be formed as a second gas discharge groove that extends in the vertical direction on an outer circumferential surface of the lower jig.

In the gas collecting apparatus of the present disclosure, a flow path connection groove may be formed in a ring shape along an outer circumferential surface on a lower end of the upper jig or an upper end of the lower jig.

A jig for a gas collecting apparatus of the present disclosure may include

- an upper jig provided in a cylindrical shape that extends in a vertical direction; and
- a lower jig having an upper end coupled to a lower end of the upper jig, and
- wherein a battery insertion hole into which an upper end of a cylindrical battery is inserted may be formed in the upper jig,
- the battery insertion hole may be formed in a cylindrical shape that extends in the vertical direction,
- the cylindrical battery is inserted so that its outer circumferential surface is in close contact with an inner circumferential surface of the battery insertion hole,
- a battery insertion groove into which a lower end of the cylindrical battery is inserted may be formed on an upper surface of the lower jig,
- the battery insertion groove may be provided in a cylindrical shape that extends in a vertical direction,
- the cylindrical battery is inserted so that its outer circumferential surface is in close contact with an inner circumferential surface of the battery insertion groove,
- a first gas discharge groove that extends in the vertical direction may be formed on an outer circumferential surface of the upper jig, and
- a second gas discharge groove that extends in the vertical direction may be formed on an outer circumferential surface of the lower jig.

In the jig for a gas collecting apparatus of the present disclosure, the first gas discharge groove may extend from an upper end to the lower end of the upper jig, and an upper end of the second gas discharge groove may be positioned on the upper end of the lower jig.

In the jig for a gas collecting apparatus of the present disclosure, a ring-shaped third gas discharge groove that is formed along an outer circumferential surface of the lower jig may be formed, and a lower end of the second gas discharge groove may be connected to the third gas discharge groove.

In the jig for a gas collecting apparatus of the present disclosure, a flow path connection groove may be formed in a ring shape along an outer circumferential surface on the lower end of the upper jig, and a lower end of the first gas discharge groove may be connected to the flow path connection groove.

In the jig for a gas collecting apparatus of the present disclosure, a flow path connection groove may be formed in the ring shape along an outer circumferential surface on the upper end of the lower jig, and an upper end of the second gas discharge groove may be connected to the flow path connection groove.

Hereinafter, example embodiments according to the present disclosure will be described in detail with reference to the accompanying drawings. In this process, the size or shape of components shown in the drawings may be exaggerated for clarity and convenience of explanation. In addition, terms specifically defined in consideration of configurations and operations of the present disclosure may vary depending on the intention or custom of a user or operator. Definitions of these terms should be made based on the context throughout this specification.

In the description of the present disclosure, it should be noted that orientation or positional relationships indicated by the terms such as "center", "upper", "lower", "left", "right", "vertical", "horizontal", "inside", "outside", "one side", and "the other side" are based on orientation or positional relationships shown in the drawings or orientation or positional relationships usually of disposition when a product of the present disclosure is used, are merely for the description and brief illustration of the present disclosure, and should not be construed as limiting the present disclosure because they are not suggesting or implying that the indicated apparatus or element must be configured or operated in the specified orientation with the specified orientation.

Figure 2:
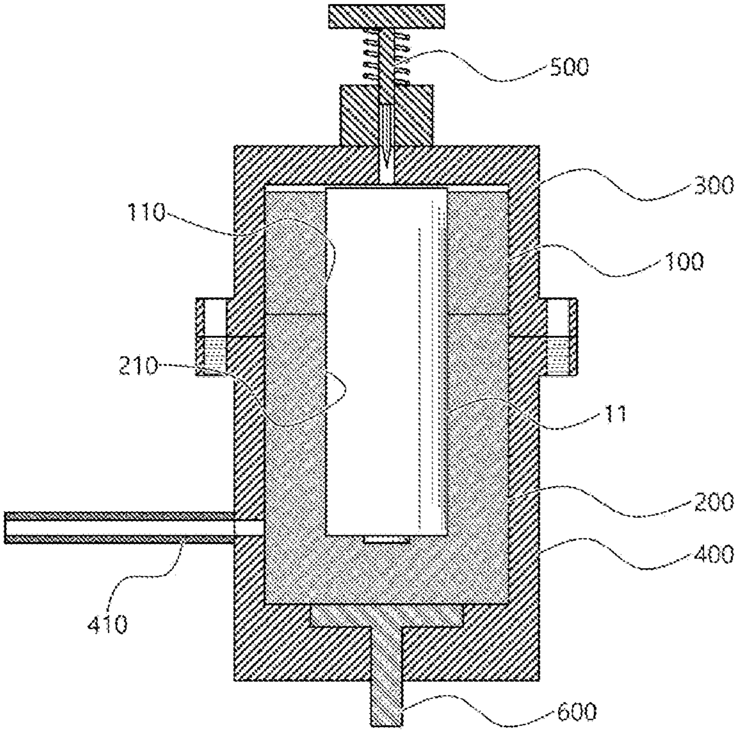
FIG. 2 is a cross-sectional view illustrating another embodiment of a gas collecting apparatus of the present disclosure.
Figure 3:
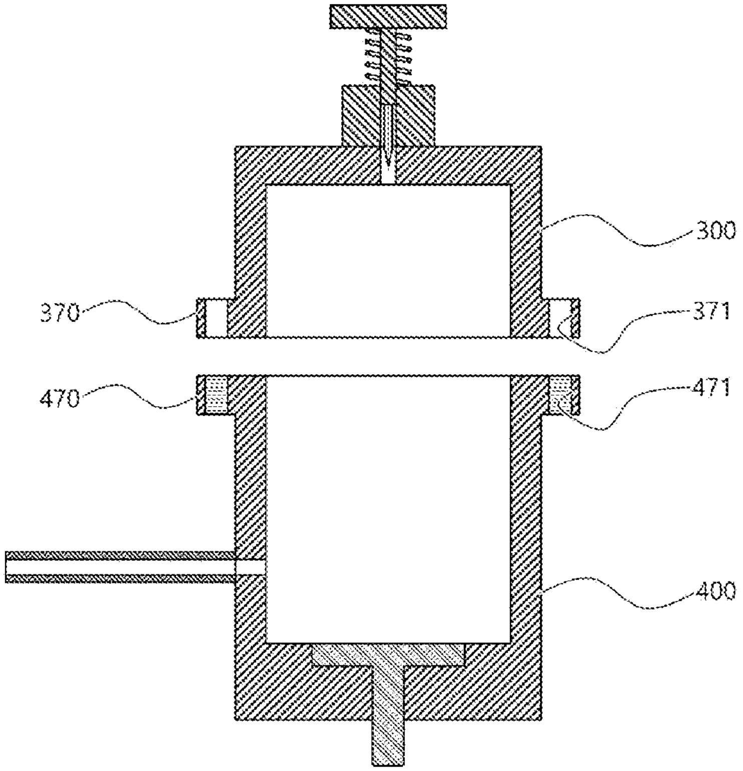
FIG. 3 is a cross-sectional view illustrating separated states of an upper housing and a lower housing.
Figure 4:
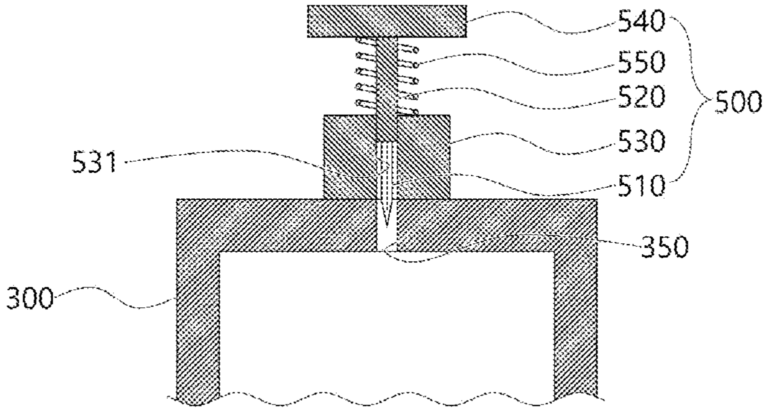
FIG. 4 is a detailed view illustrating a punching portion.
Figure 5:
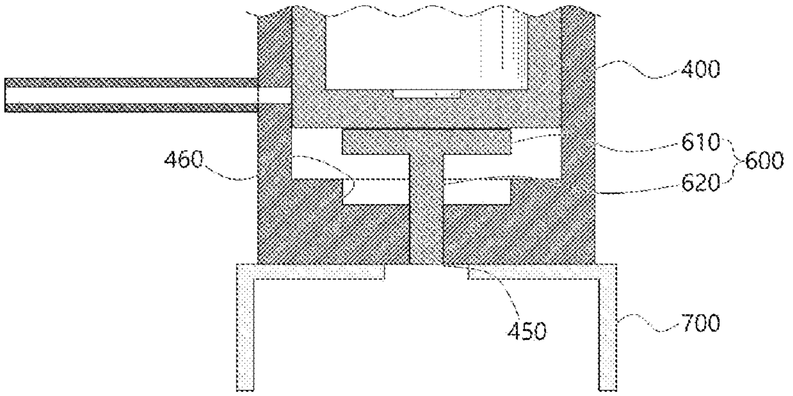
FIG. 5 is a detailed view illustrating a button portion.
Figure 6:
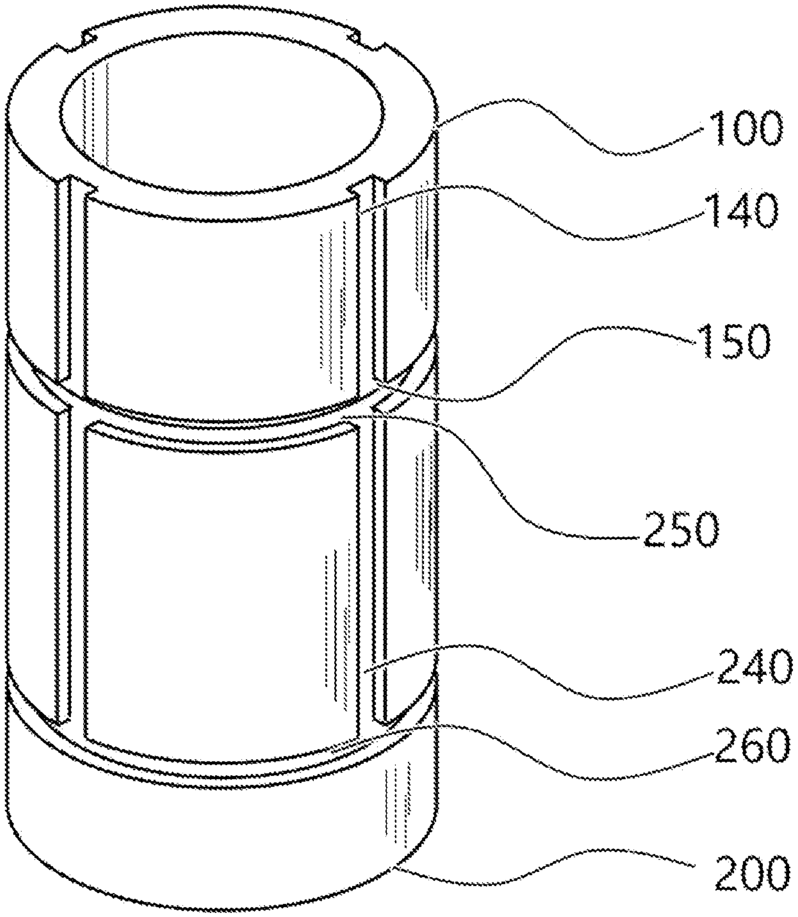
FIG. 6 is a perspective view illustrating an upper jig and a lower jig.

FIG. 1 is a cross-sectional view illustrating a gas collecting apparatus of the present disclosure. FIG. 2 is a cross-sectional view illustrating another embodiment of the gas collecting apparatus of the present disclosure. FIG. 3 is a cross-sectional view illustrating separated states of an upper housing 300 and a lower housing 400. FIG. 4 is a detailed view illustrating a punching portion 500. FIG. 5 is a detailed view illustrating a button portion 600. FIG. 6 is a perspective view illustrating an upper jig 100 and a lower jig 200.

Hereinafter, with reference to FIGS. 1 to 6, the gas collecting apparatus of the present disclosure will be described in detail.

The gas collecting apparatus of the present disclosure may be applied to a cylindrical battery, a prismatic battery, a coin-type battery that has a case made of a rigid material and especially optimized for the cylindrical battery.

The gas collecting apparatus of the present disclosure may be configured to perforate a battery 11 in a closed space, diffuse gas generated inside the battery 11 and discharged therefrom into the closed space, and then deliver the gas to a separate gas collection container or to a gas analyzer.

As shown in FIG. 1, the gas collecting apparatus of the present disclosure may include

- the lower jig 200 in which a battery insertion groove 210 into which a lower end of the battery 11 is inserted is formed on an upper surface so that an upper end of the battery 11 protrudes;
- the upper jig 100 having a lower surface in close contact with the upper surface of the lower jig 200 and a battery insertion hole 110 into which the battery 11 is inserted so that an upper surface of the battery 11 is exposed;
- the lower housing 400 configured to accommodate the lower jig 200 therein; and
- the upper housing 300 configured to accommodate the upper jig 100 therein and having a lower end coupled to an upper end of the lower housing 400.

In other words, the gas collecting apparatus of the present disclosure may be configured to accommodate the battery 11, in which the upper jig 100 and the lower jig 200 are mounted, in a closed space that is formed by coupling of the upper housing 300 and the lower housing 400, and collect gas generated from the battery 11.

As shown in FIGS. 1 and 2, even if a size of the battery that is subjected to gas collection changes, by mounting the upper jig 100 and the lower jig 200 corresponding to specifications of the battery to the battery 11, it is possible to have the battery 11 positioned in place inside the closed space that is formed by the upper housing 300 and the lower housing 400. In addition, in accordance with changes in the specifications of the battery 11, it is also possible to constantly maintain concentration of exhaust gas due to changes in a volume occupied by the battery 11 inside the closed space that is formed by the upper housing 300 and the lower housing 400.

The upper jig 100 and the lower jig 200 may be made of a Teflon material that has a small coefficient of friction and exhibits superior chemical resistance and heat resistance. For example, the upper jig 100 and the lower jig 200 may be in cylindrical shapes extending in a vertical direction.

In the upper jig 100, the battery insertion hole 110 into which the battery 11 is inserted may be formed. The battery insertion hole 110 may also be formed in a cylindrical shape that extends in the vertical direction, and an inner diameter of the battery insertion hole 110 may be identical to an outer diameter of the battery 11, thereby bringing an inner circumferential surface of the battery insertion hole 110 into completely close contact with an outer circumferential surface of the battery 11. In other words, the upper jig 100 may be formed in a form of a cylindrical pipe having an outer diameter of the battery 11 as an inner diameter. Therefore, while the upper jig 100 is mounted on the battery 11, the battery 11 may be in a state in which an upper end and a lower end are exposed.

On an upper surface of the lower jig 200, the battery insertion groove 210 into which the battery 11 is inserted may be formed. The battery insertion groove 210 may also be provided in a cylindrical shape that extends in the vertical direction to correspond to a shape of the battery 11. An inner diameter of the battery insertion groove 210 may also be formed to be identical to an outer diameter of the battery 11, thereby brining an outer circumferential surface of the battery 11 into completely close contact with an inner circumferential surface of the battery insertion groove 210.

In other words, when the upper jig 100 and the lower jig 200 are mounted on the battery 11, the upper jig 100 may be mounted in a form of surrounding an upper portion of a side of the battery 11, and a lower end of the battery 11 protruding more downward than a lower end of the upper jig 100 may be inserted into the battery insertion groove 210 of the lower jig 200.

The plurality of upper jigs 100 and lower jigs 200 may be provided according to the types of the battery 11 that is subjected to gas collection, and specifications of the battery insertion hole 110 and the battery insertion groove 210 may vary respectively depending on the types of the battery 11. However, the outer diameter may be the same with respect to the plurality of upper jigs 100 and the plurality of lower jigs 200, such that even if the types of the battery 11 vary, a volume of a space in which the gas is discharged in the closed space formed by the upper housing 300 and the lower housing 400 may be the same.

As shown in FIG. 3, the upper housing 300 and the lower housing 400 may be formed with closed spaces which are configured to accommodate the battery 11, the upper jig 100, and the lower jig 200 therein. The closed space may be provided in a cylindrical shape that extends in the vertical direction to correspond to outer circumferential surfaces of the cylindrical upper jig 100 and lower jig 200, and an upper part of the cylindrical closed space may be formed inside the upper jig 100, while a lower part of the closed space may be formed inside the lower jig 200. In other words, an inner space of the upper housing 300 may be in a state in which a lower side is open, and an upper inner space of the lower housing 400 is open.

The upper housing 300 and the lower housing 400 may be formed of materials such as SUS which is a rigid, chemical resistant, and heat resistant material, so that the closed space may maintain a constant volume even with changes in internal pressure. The outer circumferential surfaces of the upper jig 100 and the lower jig 200 may come in completely close contact with inner circumferential surfaces of the upper housing 300 and the lower housing 400.

The sum of vertical lengths of the upper jig 100 and the lower jig 200 may be greater than a depth of the closed space that is formed inside the lower housing 400.

In the upper end of the lower housing 400, a first sealing groove into which a first sealing member is inserted at a position that faces the lower end of the upper housing 300 may be formed. The first sealing member may be an O-ring, and the first sealing groove may be formed in a closed loop shape surrounding the closed space in which the battery 11 is accommodated.

As shown in FIG. 3, on each of the lower end of the upper housing 300 and the upper end of the lower housing 400, a first protrusion 370 and a second protrusion 470 protruding in a radial direction may be formed, respectively. In each of the first protrusion 370 and the second protrusion 470, a first fixing member insertion hole 371 and a second fixing member insertion hole 471 into which a fixing member for coupling between the upper housing 300 and the lower housing 400 is inserted may be formed, respectively. The first fixing member insertion hole 371 and the second fixing member insertion hole 471 may be formed in a position facing each other, and the fixing member may penetrate the first fixing member insertion hole 371 and the second fixing member insertion hole 471 at the same time to couple the upper housing 300 and the lower housing 400. For example, the fixing member may be a bolt, and a thread may be formed on one of inner circumferential surfaces of the first fixing member insertion hole 371 and the second fixing member insertion hole 471 to form a screw bonding with the fixing member.

In the gas collecting apparatus of the present disclosure, a punching portion 500 configured to form a gas discharge hole by perforating an upper end of the battery 11 may be provided on a ceiling surface of the upper housing 300.

A needle passage hole 350 may be formed on an upper surface of the upper housing 300, and a needle member 510 of the punching portion 500 may be inserted into the upper housing 300 through the needle passage hole 350 to perforate the upper end of the battery 11. The perforated hole may be a gas discharge hole functioning as a passage for gas inside the battery 11 to be discharged to the outside of the battery 11.

As shown in FIG. 4, the punching portion 500 may include the needle member 510 inserted into the upper housing 300 through the needle passage hole 350 and having a lower end penetrating the upper end of the battery 11 to form the gas discharge hole, a body member 520 positioned above the upper housing 300 and having a lower end coupled with an upper end of the needle member 510, a guide member 530 coupled to the upper end of the upper housing 300 and formed with a guide hole 531 configured to guide a vertical movement of the body member 520, a pressing member 540 coupled to an upper end of the body member 520 protruding toward an upper end of the guide member 530, and an elastic member 550 inserted between a lower end of the pressing member 540 and the upper end of the guide member 530.

The needle member 510 may have a lower end protruding from a ceiling surface inside the upper housing 300 to perforate the upper end of the battery 11.

The body member 520 may be formed in a rod shape extending in the vertical direction and configured to operate the needle member 510 coupled to a lower end while moving vertically.

The guide member 530 may be coupled to an upper end of the upper housing 300, and a guide hole 531 penetrated in the vertical direction may be formed. The body member 520 may be inserted into the guide hole 531 to guide a vertical movement. In the guide hole 531, a second sealing groove into which a second sealing member is inserted may be formed. The second sealing member may be an O-ring and positioned in a shape surrounding the body member 520. The second sealing groove may also be provided in a shape of closed loop surrounding the body member 520.

The pressing member 540 may be provided in a disc shape having a diameter greater than that of the body member 520, and an upper end of the body member 520 may be coupled to a center of a lower surface of the pressing member 540.

The elastic member 550 may have a lower end supported on an upper end of the guide member 530 and an upper end supported on a lower surface of the pressing member 540 and may be formed of an elastic material having resilience. Specifically, the elastic member 550 may be provided in a shape of cylindrical spring, and the body member 520 may be inserted into a center of the elastic member 550. The elastic member 550 may allow the needle member 510 to automatically retreat after forming the gas discharge hole in the battery 11.

As shown in FIG. 5, a button portion 600 configured to press a lower end of the lower jig 200 to push up the lower jig 200 may be provided on a bottom surface of the lower housing 400. The button portion 600 may be configured to lift the lower jig 200 and the battery 11 so as to easily remove the lower jig 200 from the gas collecting apparatus at the end of gas collection. In other words, the upper end of the lower jig 200 may be positioned higher than the upper end of the lower housing 400 through the button portion 600, and a user may easily separate the lower jig 200 from the lower housing 400 through the button portion 600. For example, an outer circumferential surface of the lower jig 200 and an inner circumferential surface of the lower housing 400 may be in completely close contact, and the lower jig 200 may be easily discharged from the lower housing 400 through the button portion 600.

In the gas collecting apparatus of the present disclosure, a plurality of the upper jigs 100 and the lower jigs 200 may be provided to correspond to the specifications of the battery that vary according to various types of the battery. Analysis conducted on each battery may be performed for a single upper housing 300 and lower housing 400, by selecting one that is suitable for the battery 11 to be analyzed from among the plurality of upper jigs 100 and lower jigs 200, and assembling the battery 11, the upper jig 100, the lower jig 200, the upper housing 300, and the lower housing 400. In this case, the gas collecting apparatus of the present disclosure may make separation between the lower jig 200 and the lower housing 400 easy by means of the button portion 600 when it comes to replacement of the upper jig 100 and the lower jig 200 for gas collection of the battery having another specification.

As shown in FIG. 5, an ascending member insertion hole 450 may be formed on the lower surface of the lower housing 400, and the button portion 600 may be inserted into the ascending member insertion hole 450, such that an upper end may be positioned inside the lower housing 400, and the lower end outside the lower housing 400. Therefore, by operation from the outside of the gas collecting apparatus, a force for separating the battery 11 positioned inside the gas collecting apparatus may be applied to the battery 11.

Specifically, the button portion 600 may include a support member 610 whose upper surface is in contact with a lower surface of the lower jig 200 in the lower housing 400 to support the lower jig 200, and an ascending member 620 having an upper end coupled to a lower surface of the support member 610 and a lower end protruding more downward than the lower end of the lower housing 400 through the ascending member insertion hole 450.

More specifically, the support member 610 may be provided in a disc shape that has a plane perpendicular to a vertical direction, the ascending member 620 may be provided in a cylindrical shape that extends in the vertical direction, and a diameter of the support member 610 may be greater than that of the ascending member 620. In other words, with the above structure, it is possible to prevent leakage by minimizing an inner diameter of the ascending member insertion hole 450 of the lower housing 400 and make the support member 610 stably lift the lower jig 200 by increasing an area of the support member 610 that is in contact with the lower jig 200.

In this case, a support member insertion groove 460 into which the support member 610 is inserted may be formed on the bottom surface of the lower housing 400 so that the lower surface of the lower jig 200 comes in completely close contact with a bottom surface inside the lower housing 400. Therefore, the support member 610 may be completely embedded so as to prevent protrusion from the bottom surface inside the lower housing 400 through the support member insertion groove 460, thereby preventing formation of an unnecessary diffusion space between a lower surface of the lower jig 200 and the bottom surface inside the lower housing 400.

A support bracket 700 configured to make the lower surface of the lower housing 400 separated from an installation surface of the gas collecting apparatus may be provided on the lower end of the lower housing 400. Thus, the lower end of the ascending member 620 may not come in contact with the installation surface.

A gas discharge pipe 410 configured to discharge gas generated in the battery 11 may be connected to the lower housing 400.

In this case, since gas generated in the battery 11 may be discharged to the gas discharge hole formed at an upper end of the battery 11, a flow path for connecting the gas discharge hole and the gas discharge pipe 410 may be required.

Accordingly, a first flow path may be formed in the upper jig 100, a second flow path may be formed in the lower jig 200, and the gas discharged from the battery 11 through the gas discharge hole may be transferred to the gas discharge pipe 410 through the first flow path and the second flow path.

As shown in FIG. 1, an upper surface of the upper jig 100 may be spaced apart from the ceiling surface of the upper housing 300, and as shown in FIG. 6, the first flow path may be formed as a first gas discharge groove 140 extending in the vertical direction on an outer circumferential surface of the upper jig 100, while the second flow path may be formed as a second gas discharge groove 240 extending in the vertical direction on an outer circumferential surface of the lower jig 200. The first gas discharge groove 140 extends from the upper end to the lower end of the upper jig 100, and the second gas discharge groove 240 extends from the upper end of the lower jig 200 to a height of the gas discharge pipe 410.

In this case, ring-shaped flow path connection grooves 150, 250 may be formed along an outer circumferential surface on a lower end of the upper jig 100 or an upper end of the lower jig 200, such that gas may be transferred to the gas discharge pipe 410 through the flow path connection grooves 150, 250 even if a lower end of the first gas discharge groove 140 and an upper end of the second gas discharge groove 240 do not exactly face each other.

A ring-shaped third gas discharge groove 260 that is formed along an outer circumferential surface of the lower jig 200 may be formed in the lower jig 200, and a lower end of the second gas discharge groove 240 may be connected to the third gas discharge groove 260. Therefore, when inserting the lower jig 200 into the lower housing 400, gas may be stably discharged through the third gas discharge groove 260 even when no additional alignment is performed.

Although the example embodiments according to the present disclosure have been described above, these are merely exemplary, and those skilled in the art will understand that various modifications and equivalent ranges of the example embodiments are possible therefrom. Accordingly, the scope for true technical protection of the present disclosure should be defined by the appended claims.

EXPLANATION OF SYMBOLS

11 . . . Battery 100 . . . Upper jig
110 . . . Battery insertion hole 140 . . . First gas discharge groove
150, 250 . . . Flow path connection groove 200 . . . Lower Jig
210 . . . Battery insertion groove 240 . . . Second gas discharge groove
260 . . . Third gas discharge groove 300 . . . Upper housing
350 . . . Needle passage hole 370 . . . First protrusion
371 . . . First fixing member insertion hole 400 . . . Lower housing
410 . . . Gas discharge pipe 450 . . . Ascending member insertion hole
460 . . . Support member insertion groove 470 . . . Second protrusion
471 . . . Second fixing member insertion hole 500 . . . Punching portion
510 . . . Needle member 520 . . . Body member
530 . . . Guide member 531 . . . Guide hole
540 . . . Pressing member 550 . . . Elastic member

600 . . . Button portion 610 . . . Support member
620 . . . Ascending member 700 . . . Support bracket

INDUSTRIAL APPLICABILITY

A gas collecting apparatus of the present disclosure is capable of collecting high-concentration gas for various batteries, while it is easy to mount, replace, or remove the battery at the beginning and end of analysis.

The invention claimed is:

1. A gas collecting apparatus, comprising:

a lower jig including a battery insertion groove configured to accommodate a lower end of a battery so that an upper end of the battery protrudes from an upper surface of the lower jig;

an upper jig including a lower surface in close contact with the upper surface of the lower jig and a battery insertion hole configured to accommodate the upper end of the battery so that an upper surface of the battery is exposed;

a lower housing accommodating the lower jig therein; and an upper housing accommodating the upper jig therein and having a lower end coupled to an upper end of the lower housing.

2. The gas collecting apparatus of claim 1, further comprising a punching portion configured to form a gas discharge hole by perforating the upper end of the battery, formed on a ceiling surface of the upper housing.

3. The gas collecting apparatus of claim 2, wherein the upper housing further comprises a needle passage hole is-formed on an upper surface of the upper housing, and wherein the punching portion comprises:

a needle member inserted into the upper housing through the needle passage hole and having a lower end penetrating the upper end of the battery to form the gas discharge hole;

a body member positioned above the upper housing and having a lower end coupled to an upper end of the needle member;

a guide member coupled to an upper end of the upper housing and provided with a guide hole configured to guide a vertical movement of the body member;

a pressing member coupled to an upper end of the body member that protrudes toward an upper end of the guide member; and an elastic member inserted between a lower end of the pressing member and the upper end of the guide member.

4. The gas collecting apparatus of claim 1, further comprising a button portion configured to press a lower end of the lower jig to push up the lower jig, on a bottom surface of the lower housing.

5. The gas collecting apparatus of claim 4, wherein the lower housing further comprises an ascending member insertion hole is-formed on a lower surface of the lower housing, and wherein the button portion comprises:

a support member whose upper surface is in contact with a lower surface of the lower jig in the lower housing to support the lower jig; and an ascending member having an upper end coupled to a lower surface of the support member and a lower end protruding more downward than a lower end of the lower housing through the ascending member insertion hole.

6. The gas collecting apparatus of claim 5, wherein the support member has a disc shape having a plane perpendicular to a vertical direction, wherein the ascending member has a cylindrical shape that extends in the vertical direction, and wherein a diameter of the support member is greater than that of the ascending member.

7. The gas collecting apparatus of claim 6, wherein a support member insertion groove into which the support member is inserted is formed on the bottom surface of the lower housing.

8. The gas collecting apparatus of claim 2, further comprising a gas discharge pipe configured to discharge gas generated in the battery, is connected to the lower housing.

9. The gas collecting apparatus of claim 8, wherein the upper jig comprises a first flow path, and the lower jig comprises a second flow path, and wherein the gas discharge pipe is connected to the gas discharge hole to discharge gas from the battery through the first flow path and the second flow path.

10. The gas collecting apparatus of claim 9, wherein an upper surface of the upper jig is spaced apart from the ceiling surface of the upper housing, wherein the first flow path is formed as a first gas discharge groove that extends in a vertical direction on an outer circumferential surface of the upper jig, and wherein the second flow path is formed as a second gas discharge groove that extends in the vertical direction on an outer circumferential surface of the lower jig.

11. The gas collecting apparatus of claim 10, further comprising a flow path connection groove is formed in a ring shape along an outer circumferential surface on a lower end of the upper jig or an upper end of the lower jig.

12. A jig for a gas collecting apparatus, the jig comprising:

an upper jig having a cylindrical shape that extends in a vertical direction; and a lower jig having an upper end coupled to a lower end of the upper jig, and wherein the upper jig comprises a battery insertion hole configured to accommodate an upper end of a cylindrical battery and an outer circumferential surface of the upper end of the cylindrical battery is in close contact with an inner circumferential surface of the battery insertion hole, wherein the battery insertion hole has a cylindrical shape that extends in the vertical direction, wherein the lower jig comprises a battery insertion groove configured to accommodate a lower end of the cylindrical battery, and an outer circumferential surface of the lower end of the cylindrical battery is in close contact with an inner circumferential surface of the battery insertion groove, wherein the battery insertion groove has a cylindrical shape that extends in the vertical direction, wherein a first gas discharge groove that extends in the vertical direction is formed on an outer circumferential surface of the upper jig, and wherein a second gas discharge groove that extends in the vertical direction is formed on an outer circumferential surface of the lower jig.

13. The jig of claim 12, wherein the first gas discharge groove extends from an upper end to the lower end of the upper jig, and an upper end of the second gas discharge groove is positioned on the upper end of the lower jig.

14. The jig of claim 13, further comprising a ring-shaped third gas discharge groove formed along an outer circumferential surface of the lower jig, and wherein a lower end of the second gas discharge groove is connected to the third gas discharge groove.

15. The jig of claim 13, further comprising a flow path connection groove formed in a ring shape along an outer circumferential surface on the lower end of the upper jig, and wherein a lower end of the first gas discharge groove is connected to the flow path connection groove.

16. The jig of claim 13, further comprising a flow path connection groove is formed in a ring shape along an outer circumferential surface on the upper end of the lower jig, and wherein an upper end of the second gas discharge groove is connected to the flow path connection groove.

* * * * *